(12) United States Patent
Hood

(10) Patent No.: US 10,944,356 B2
(45) Date of Patent: Mar. 9, 2021

(54) WIRE COVER AND MOUNTING BRACKET

(71) Applicant: David C. Hood, Lincoln, CA (US)

(72) Inventor: David C. Hood, Lincoln, CA (US)

( * ) Notice: Subject to any disclaimer, the term of this patent is extended or adjusted under 35 U.S.C. 154(b) by 0 days.

(21) Appl. No.: 16/248,104

(22) Filed: Jan. 15, 2019

(65) Prior Publication Data

US 2019/0372516 A1 Dec. 5, 2019

Related U.S. Application Data

(63) Continuation of application No. 15/488,275, filed on Apr. 14, 2017, now Pat. No. 10,187,007.

(Continued)

(51) Int. Cl.
*H02S 30/10* (2014.01)
*H02S 40/36* (2014.01)
(Continued)

(52) U.S. Cl.
CPC ............ *H02S 30/10* (2014.12); *F16B 5/0607* (2013.01); *F24S 25/634* (2018.05); *H02S 20/10* (2014.12);
(Continued)

(58) Field of Classification Search
CPC ........ H02S 40/34; H02S 40/345; H02S 20/26; H02S 20/00; H02S 20/10; H02S 20/20; H02S 20/21; H02S 20/22; H02S 20/23; H02S 30/10; H02S 40/30–44; H02S 30/00–20; H02S 40/36; F24J 2002/522;
(Continued)

(56) References Cited

U.S. PATENT DOCUMENTS 2,815,556 A 12/1957 Neil
3,701,836 A 10/1972 Ward et al.
(Continued)

FOREIGN PATENT DOCUMENTS

JP 2010192854 A 9/2010
JP 2015158101 A 9/2015
(Continued)

OTHER PUBLICATIONS

U.S. Appl. No. 29/607,442—Office Action dated Aug. 22, 2019, 12 pages.
(Continued)

*Primary Examiner* — Eric R Smith
(74) *Attorney, Agent, or Firm* — Haynes Beffel & Wolfeld LLP; Andrew L. Dunlap

(57) ABSTRACT

A photovoltaic panel wire cover assembly, used with a PV panel having a perimeter trim piece, includes clips, an elongate wire cover and fastener structure. Each clip includes a proximal end and long and short legs, the long leg parallel with and joined to the short leg at the clip proximal end. A gap between the long and short legs is sized for receipt of the trim piece. The wire cover includes a wire-covering housing defining a housing interior and having first and second opposite sides and a first flange extending from the first opposite side and positioned against the long leg. The fastener structure engages the short leg and the first flange to bias the first flange and the long leg therewith towards the short leg. The wire cover can be fastened to the trim piece through the clips without penetrating the PV panel.

10 Claims, 12 Drawing Sheets

Related U.S. Application Data

(60) Provisional application No. 62/322,363, filed on Apr. 14, 2016, provisional application No. 62/404,653, filed on Oct. 5, 2016.

(51) Int. Cl.

| | | |
|---|---|---|
| *H02S 40/34* | (2014.01) | |
| *F16B 5/06* | (2006.01) | |
| *F24S 25/634* | (2018.01) | |
| *H02S 20/10* | (2014.01) | |
| *H02S 40/30* | (2014.01) | |

(52) U.S. Cl.
CPC .............. *H02S 40/30* (2014.12); *H02S 40/34* (2014.12); *H02S 40/36* (2014.12)

(58) Field of Classification Search
CPC ............. F24J 2002/5298; F16B 5/0032; F16B 5/0064; F16B 5/121; F16B 5/126; F16B 5/02; F16B 5/06; F16B 5/0607; F16B 5/0685; F16B 5/12–128
See application file for complete search history.

(56) References Cited

U.S. PATENT DOCUMENTS

| | | | |
|---|---|---|---|
| 4,143,498 | A | 3/1979 | Martin, Jr. et al. |
| 4,433,200 | A | 2/1984 | Jester et al. |
| 4,526,428 | A * | 7/1985 | Sachs .................... H02G 7/053 24/115 R |
| 4,535,503 | A | 8/1985 | Narita et al. |
| 4,946,117 | A | 8/1990 | Liesegang |
| 5,125,608 | A | 6/1992 | McMaster et al. |
| 5,164,020 | A | 11/1992 | Wagner et al. |
| D340,564 | S | 10/1993 | Ledingham |
| D344,448 | S | 2/1994 | Sachs |
| D346,546 | S | 5/1994 | Tesmar, Jr. |
| D382,984 | S | 8/1997 | Junell |
| D393,289 | S | 4/1998 | Suzuki |
| 6,066,796 | A | 5/2000 | Itoyama et al. |
| D447,438 | S | 9/2001 | DiLibero |
| 6,457,218 | B1 | 10/2002 | Lawrence |
| D493,693 | S | 8/2004 | Lord |
| 7,126,059 | B2 | 10/2006 | Dinh et al. |
| D547,262 | S | 7/2007 | Ullman |
| D625,589 | S | 10/2010 | Norris et al. |
| D653,201 | S | 1/2012 | Sillett et al. |
| D669,032 | S | 10/2012 | Anwar et al. |
| D669,852 | S | 10/2012 | Eppinger |
| D673,903 | S | 1/2013 | Kobayashi |
| D686,910 | S | 7/2013 | Towell, Jr. |
| D699,176 | S | 2/2014 | Salomon et al. |
| 8,640,400 | B2 | 2/2014 | Liebendorfer |
| D702,629 | S | 4/2014 | Fukumochi et al. |
| 8,776,468 | B2 | 7/2014 | Henriquez |
| D710,792 | S | 8/2014 | Cai et al. |
| D718,228 | S | 11/2014 | Clarkson et al. |
| D719,084 | S | 12/2014 | Kruse |
| 9,178,342 | B2 | 11/2015 | Rodenberg |
| D749,402 | S | 2/2016 | Veilleux |
| D755,436 | S | 5/2016 | Jackson et al. |
| D765,591 | S | 9/2016 | West et al. |
| D768,097 | S | 10/2016 | Powers |
| D770,887 | S | 11/2016 | Sudol et al. |
| D823,786 | S | 7/2018 | Stephan et al. |
| D823,787 | S | 7/2018 | Hood |
| D835,033 | S | 12/2018 | Sorias |
| 10,177,707 | B2 | 1/2019 | Hood |
| 10,187,007 | B2 | 1/2019 | Hood |
| 2003/0070368 | A1 | 4/2003 | Shingleton |
| 2007/0056625 | A1 * | 3/2007 | Higuchi ................ H01L 31/048 136/244 |
| 2011/0088740 | A1 | 4/2011 | Mittan et al. |
| 2011/0265860 | A1 | 11/2011 | Ciasulli et al. |
| 2011/0303262 | A1 | 12/2011 | Wolter |
| 2012/0192925 | A1 | 8/2012 | Grushkowitz et al. |
| 2012/0227339 | A1 | 9/2012 | Reinecke |
| 2013/0175231 | A1 | 7/2013 | Klinga et al. |
| 2013/0256246 | A1 | 10/2013 | Tagliamonte |
| 2014/0008508 | A1 | 1/2014 | Weber |
| 2014/0048498 | A1 | 2/2014 | Kuan |
| 2014/0137927 | A1 | 5/2014 | Kim et al. |
| 2014/0230886 | A1 | 8/2014 | Werner et al. |
| 2014/0246077 | A1 | 9/2014 | Poulakis |
| 2014/0329420 | A1 | 11/2014 | Magno |
| 2015/0040967 | A1 | 2/2015 | West et al. |
| 2016/0268965 | A1 | 9/2016 | Stearns et al. |
| 2017/0207743 | A1 | 7/2017 | Lemos et al. |
| 2017/0353147 | A1 | 12/2017 | Hood |
| 2018/0076760 | A1 | 3/2018 | Hood |
| 2018/0131319 | A1 | 5/2018 | Hood |
| 2018/0131320 | A1 | 5/2018 | Hood |

FOREIGN PATENT DOCUMENTS

| | | |
|---|---|---|
| KR | 101562850 B1 * | 10/2015 |
| WO | 2009029897 A2 | 3/2009 |

OTHER PUBLICATIONS

U.S. Appl. No. 29/607,445—Office Action dated Jan. 3, 2019, 13 pages.
U.S. Appl. No. 29/607,445—Response to Office Action filed Apr. 3, 2019, 6 pages.
U.S. Appl. No. 29/607,445—Notice of Allowance dated Jul. 15, 2019, 10 pages.
U.S. Appl. No. 15/622,882—Final Office Action dated May 7, 2019, 14 pages.
PCT/US/2017/027782—International Search Report and Written Opinion dated Sep. 20, 2017, 10 pages.
U.S. Appl. No. 29/607,437—Design Application filed Jun. 13, 2017, 4 pages.
U.S. Appl. No. 29/607,440—Design Application filed Jun. 13, 2017, 4 pages.
U.S. Appl. No. 15/488,275—Office Action dated Oct. 18, 2017, 28 pages.
U.S. Appl. No. 29/607,442—Design Application filed Jun. 13, 2017, 3 pages.
U.S. Appl. No. 29/607,445—Design Application filed Jun. 13, 2017, 3 pages.
U.S. Appl. No. 15/488,275—Final Office Action dated Feb. 27, 2018, 21 pages.
U.S. Appl. No. 15/488,275—Notice of Allowance dated Sep. 21, 2018, 8 pages.
U.S. Appl. No. 15/488,275—Response to Final Office Action dated Feb. 27, 2018 filed May 11, 2018, 12 pages.
U.S. Appl. No. 15/488,275—Response to Office Action dated Oct. 18, 2017 filed Nov. 16, 2017, 14 pages.
U.S. Appl. No. 15/488,275—Advisory Action dated May 25, 2018, 6 pages.
U.S. Appl. No. 15/488,275—Response to Advisory Action dated May 25, 2018 filed May 25, 2018, 13 pages.
U.S. Appl. No. 29/607,437—Design Patent Application filed Jun. 13, 2017, 4 pages.
U.S. Appl. No. 15/622,849—Notice of Allowance dated Aug. 30, 2018, 14 pages.
Filed Jun. 13, 2017, U.S. Appl. No. 29/607,437, Pending.
Filed Jun. 13, 2017, U.S. Appl. No. 29/607,442, Pending.
Filed Jun. 13, 2017, U.S. Appl. No. 29/607,445, Allowed.
Filed Jan. 15, 2019, U.S. Appl. No. 16/248,104, Pending.
Filed Jun. 27, 2017, U.S. Appl. No. 15/634,323, Pending.
U.S. Appl. No. 15/622,849—Non-Provisional Application filed Jun. 14, 2017, 41 pages.
U.S. Appl. No. 15/622,882—Non-Provisional Application filed Jun. 14, 2017, 41 pages.
U.S. Appl. No. 15/634,323—Non-Provisional Application filed Jun. 27, 2017, 30 pages.
U.S. Appl. No. 29/607,440—Notice of Allowance dated Apr. 11, 2018, 14 pages.

(56) References Cited

OTHER PUBLICATIONS

U.S. Appl. No. 29/607,442—Response to Office Action dated Aug. 22, 2019 filed Sep. 22, 2019, 13 pages.
U.S. Appl. No. 29/607,442—Final Office Action dated Dec. 23, 2019, 7 pages.
U.S. Appl. No. 29/607,442—Response to Final Office Action dated Dec. 23, 2019 filed Jan. 31, 2020, 7 pages.
U.S. Appl. No. 15/488,275—Non-Provisional Application filed Apr. 14, 2017, 48 pages.
U.S. Appl. No. 15/622,882—Advisory Action dated Sep. 11, 2019, 4 pages.
U.S. Appl. No. 15/622,882—Response to Final Office Action filed Aug. 27, 2019, 16 pages.
U.S. Appl. No. 15/488,275—Office Action dated Jul. 24, 2018, 16 pages.
U.S. Appl. No. 15/488,275—Response to Office Action dated Jul. 24, 2018, filed Jul. 26, 2018, 12 pages.
U.S. Appl. No. 15/622,882—Notice of Allowance dated Nov. 13, 2019, 9 pages.
U.S. Appl. No. 15/634,323—Non-final Office Action dated Nov. 29, 2018, 16 pages.
U.S. Appl. No. 15/634,323—Response to Non-final Office Action dated Nov. 29, 2018, filed Apr. 29, 2019, 16 pages.
U.S. Appl. No. 15/634,323—Response to Final Office Action dated Jun. 26, 2019 filed Sep. 26, 2019, 13 pages.
U.S. Appl. No. 15/634,323—Final Office Action dated Jun. 26, 2019, 14 pages.
U.S. Appl. No. 15/634,323—Notice of Allowance dated Nov. 5, 2019, 10 pages.
U.S. Appl. No. 15/622,882—2nd Response to Final Office Action filed Sep. 20, 2019, 12 pages.
U.S. Appl. No. 15/622,882—Response to Non-Final Office Action dated Dec. 7, 2018 filed Mar. 12, 2019, 23 pages.
U.S. Appl. No. 15/622,882—Non-Final Office Action dated Dec. 7, 2018, 22 pages.
U.S. Appl. No. 29/607,437—Notice of Allowance dated Aug. 30, 2019, 13 pages.
U.S. Appl. No. 29/607,442—Notice of Allowance dated Feb. 21, 2020, 5 pages.

* cited by examiner

WIRE COVER AND MOUNTING BRACKET

PRIORITY APPLICATIONS

This application is a continuation of U.S. patent application Ser. No. 15/488,275, filed 14 Apr. 2017, entitled Wire Cover and Mounting Bracket and claims the benefit of U.S. Provisional Patent Application No. 62/322,363, filed 14 Apr. 2016, entitled Wire Cover and Mounting Bracket and U.S. Provisional Patent Application No. 62/404,653, filed 5 Oct. 2016, entitled Clip for Solar Panels and Similar Things. The disclosures of which are incorporated herein by reference.

BACKGROUND OF THE INVENTION

Solar photovoltaic (PV) panels are typically provided of rigid planar form with each panel having a similar size, typically rectangular and approximately two to three feet in a shorter dimension and four to six feet in a longer dimension. Solar cells are provided upon a front surface of the solar panel. These individual cells are electrically connected together. A junction box is provided on a rear surface of each panel which gathers up the electric power generated by the cells on the panel and passes this electric power onto wires. These wires from the junction box can facilitate wiring together of multiple panels of an array to produce the overall power generated by the array of panels.

Solar panels are required to be deployed in an outside environment exposed to solar radiation, where the panels are also exposed to extremes of temperature and moisture. Furthermore, birds and other animals typically have access to the panels and the wiring connecting the panels together. One of the significant benefits of solar power systems of the PV panel variety is that they have no moving parts which must require maintenance or periodic inspection/replacement, as is the case with other distributed power assets such as wind turbines. However, the outside exposure experienced by the panel and its associated wires can result in damage occurring to the panels even without the panels experiencing any motion. Some solar panel arrays are mounted in a movable fashion to "track" the sun. Such tracking systems can be kept quite simple and easy to maintain, so that the panels do not require significant maintenance or inspection for reliable operation.

Perhaps the greatest source of PV panel array failure is presented in association with the wires that connect the individual panels together. The wires have connectors where they are joined to other segments of wire or to the junction boxes of various panels. If the wires become damaged, the system of PV panels can fail. The wires also benefit from minimizing expense through only providing an amount of exterior insulation necessary and to otherwise structure the wire with a relatively light and low cost configuration, including diameter, conductive material, insulating material, insulating material thickness, etc. Furthermore, the wires themselves can be extensive in length and represent a significant value for the overall panel system. It is known in certain instances for thieves to steal wire, such as the wire joining PV panels together, to recycle the wire for its inherent value in the conductive metals contained therein, or to repurpose the wire in other ways.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

A photovoltaic panel wire cover assembly is used with a PV panel having a perimeter trim piece, the perimeter trim piece having a thickness. The assembly includes a plurality of clips, an elongate wire cover and fastener structure. Each clip includes a proximal end, a long leg and a short leg, the long leg parallel with and joined to the short leg at the proximal end of the clip, the long leg having a distal end. There is a gap between the long leg and the short leg of the clip sized for receipt of the perimeter trim piece of the PV panel. The elongate wire cover includes a wire-covering housing, the wire-covering housing having first and second opposite sides and a first flange extending away from the first opposite side. The wire-covering housing defines a housing interior. The first flange is positioned against the long leg of the clip. The fastener structure engages the short leg of the clip and the first flange to bias the first flange and the long leg of the clip therewith towards the short leg of the clip. The wire cover can be fastened to the perimeter trim piece of the PV panel through the clips without penetrating the PV panel.

Examples of the photovoltaic panel wire cover assembly can include one or more the following. The short leg can have holes adjacent to the proximal end aligned with each other and passing through the short leg and the long leg; the first flange can include a plurality of slotted holes therein; and the fastener structure can include a fastener passing through the slotted holes in the wire covers and into the holes in the clip. The clip can include a trim engagement element, such as a curved distal end, at the distal end of the long leg. The hole in the long leg can be a through hole through which a fastener can freely pass and the hole in the short leg can be configured, such as with threads, to engage the fastener. The wire cover can have a second flange extending away from the second opposite side, the second flange including a plurality of second slotted holes and positioned against the long leg of a second clip, the second clip engaging a second perimeter trim piece. Further fastener structure can engage the short leg of the second clip and the second flange to bias the second flange and the long leg of the second clip therewith towards the short leg of the second flange. In this way the wire cover can be fastened to the second perimeter trim piece of the PV panel through clips without penetrating the PV panel. The elongate wire cover can have an open end, and the assembly can include a closed end cap mountable to the open end of the elongate wire cover to prevent access to the housing interior. The assembly can also include an open end cap, having a wire passage opening, mountable to an open end of the elongate wire cover, and a jumper tube extending from the open end cap to provide a wire passageway from the wire passage opening through the jumper tube, whereby the open end cap and jumper tube extending therefrom prevents access to the housing interior other than through the wire passageway.

Other features, aspects and advantages of technology disclosed can be seen on review the drawings, the detailed description, and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DESCRIPTION OF THE INVENTION

To protect the wires and to hide them from view, it is desirable to provide a cover for the runs of wire which join PV panels together. Such covers would both protect the wires and make the wires less enticing to thieves, and present some degree of impediment to thieves interested in stealing the wires. While a basic cover could be provided over runs of wire joining panels together including a cover element and with a flange having a hole therein which can receive a fastener, a significant problem is encountered in that the flange of such a basic cover requires a hole in the panel through which a fastener can pass for connecting the cover to a panel. PV panels are typically substantially free of fastener holes thereon, other than fastener holes which are already dedicated to other purposes, including panel mounting purposes. Without a hole available for securing such a cover to the panel, one is left with the undesirable prospect of perhaps drilling an additional hole in the panel (which may void its warranty), which not only has significant propensity to damage the panel, it involves significant additional work. Accordingly, a need exists for a system for a wire-covering system for an array of photovoltaic panel which does not require drilling of holes into the panels, but can still allow for a wire cover to be mounted to the panels in a simple manner.

Figure 1:
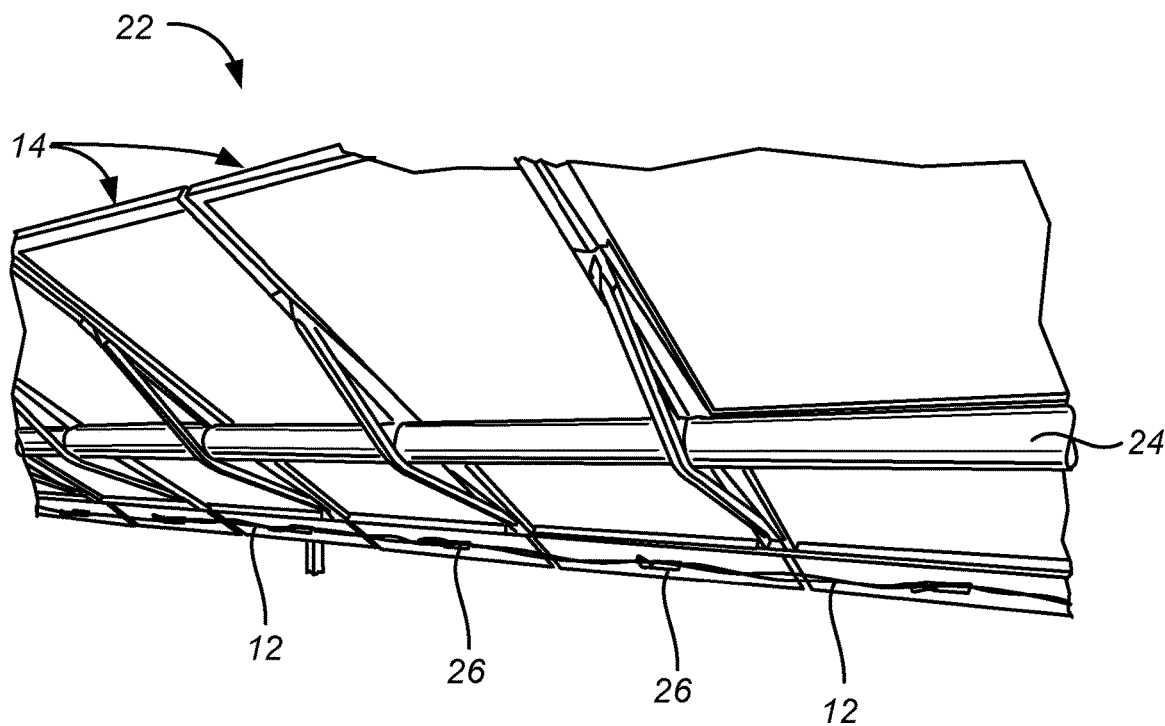
FIG. 1 is a rear perspective view of a conventional array of PV panels mounted to a common tracking bar.

FIG. 1 is a rear perspective view of a conventional array 22 of PV panels 14 mounted to a common tracking bar 24. A junction box 26 is seen mounted along an edge of each PV panel 14 with exposed wires 12 extending from the junction boxes.

Figure 2:
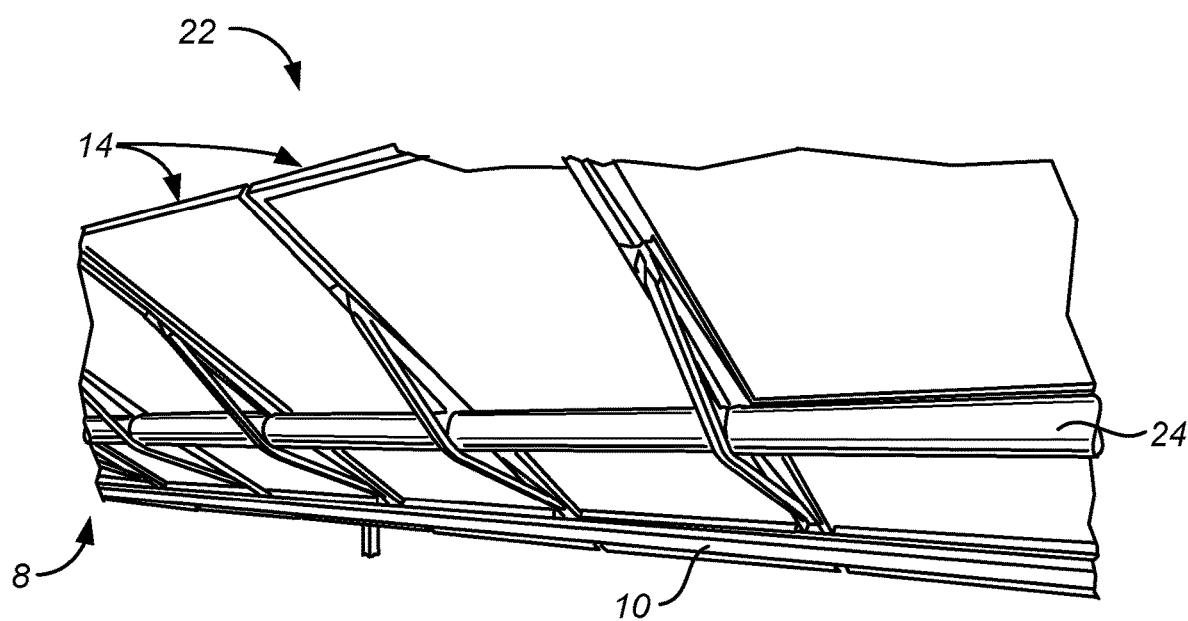
FIG. 2 is a rear perspective view of an array of PV panel wire cover assembly used with an array of PV panels mount to a common tracking bar.

With this technology, a PV panel wire cover assembly 8, see FIG. 2, includes a wire cover 10, also referred to as cover 10, for covering wires 12 which join photovoltaic (PV) panels 14 together so that they cannot be seen and to help protect the wires from the weather, vandalism, theft and animals. PV panels 14 are also referred to as panels 14 or solar panels 14. Assembly 8 also includes a clip 16 which can be easily attached to a panel 14 without requiring drilling of holes thereinto, and which clip 16 presents a hole 18 to which a fastener 20, such as a screw or bolt, can join after having interfaced with a wire cover 10, so that between the wire cover 10 and a series of such clips 16, the wire cover 10 can be coupled to the panels in a manner overlying the wires thereof.

Figure 3:
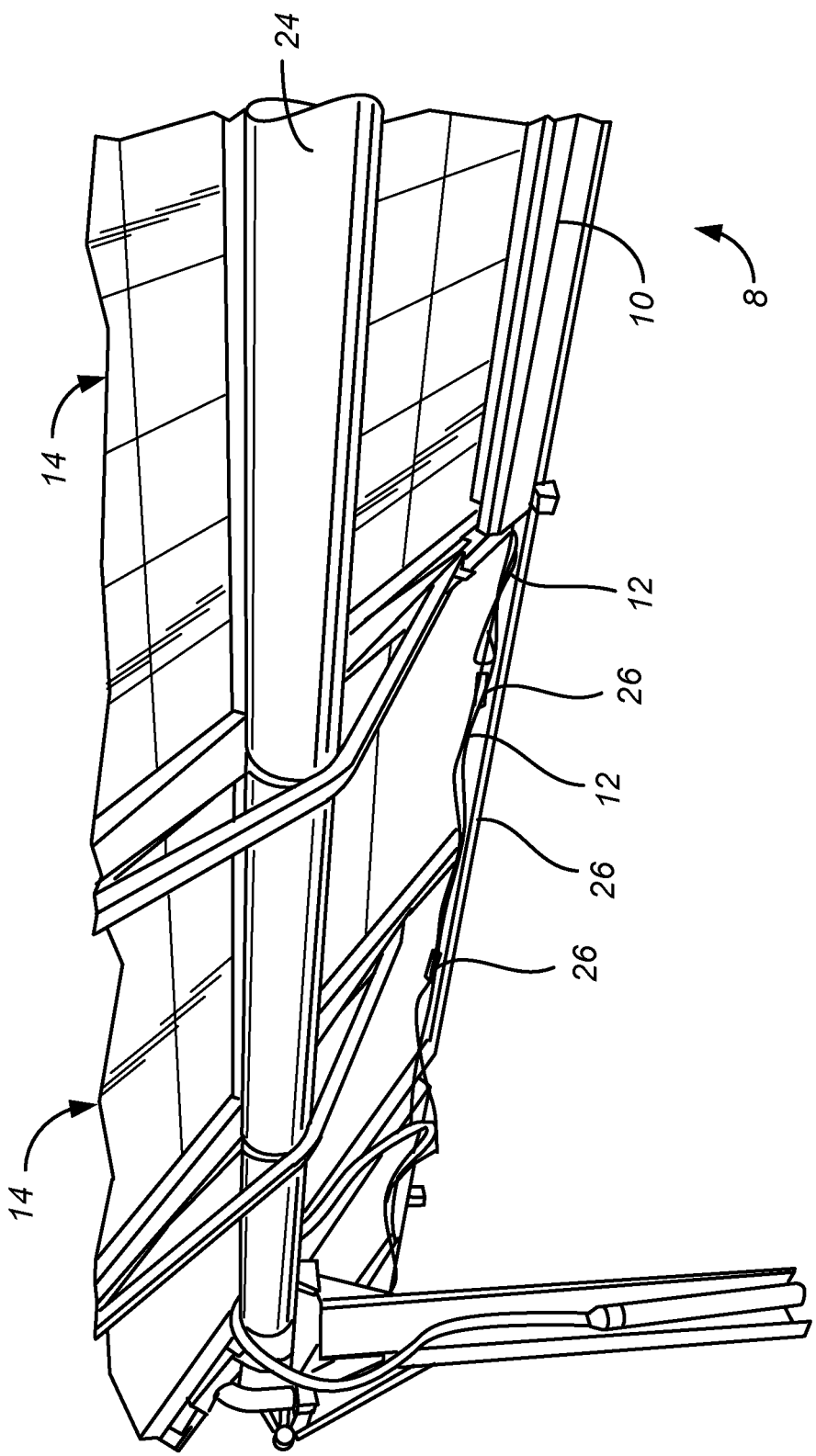
FIG. 3 is a view similar to that of FIG. 2 during the installation of wire covers to the array of PV panels, showing wires covered by a wire cover and wires to be covered by a subsequently installed wire cover.

FIG. 3 shows a wire cover 10 during installation with wires 12 extending from the open end of a wire cover 10 prior to installation of the next wire cover 10. FIGS. 8-11 illustrate how the wire cover 10 has a pair of flanges 28, 30 and a wire-covering housing 32 defining a housing interior 34 between the flanges. Wire-covering housing 32 is sized, in particular to have sufficient depth 36, to accommodate the wires 12 bundled therein. The flanges 28, 30 include slots. These slots are preferably of a variety which is elongate in form with rounded ends and with a length thereof parallel with a length of the wire-covering housing 32 of the wire cover 10. Such slots are provided on each flange 28, 30 directly adjacent to this wire-covering housing 32. Because the panel-to-panel spacing 46 between solar panels 14 in array 22 can vary slightly, slots 38, 40 are provided rather than a single hole, to accommodate some variation in panel-to-panel spacing. Longer flange 28 includes a notch 42 at each end. Notch 42 is useful in placing cover 10 under the edge of the PV panel frame thus reducing the need for clips and speeding up installation. However, for some types of equipment notch 42 can be omitted to create a notch less wire cover 10 indicated by the dashed lines 44 in FIG. 8.

Figure 4:
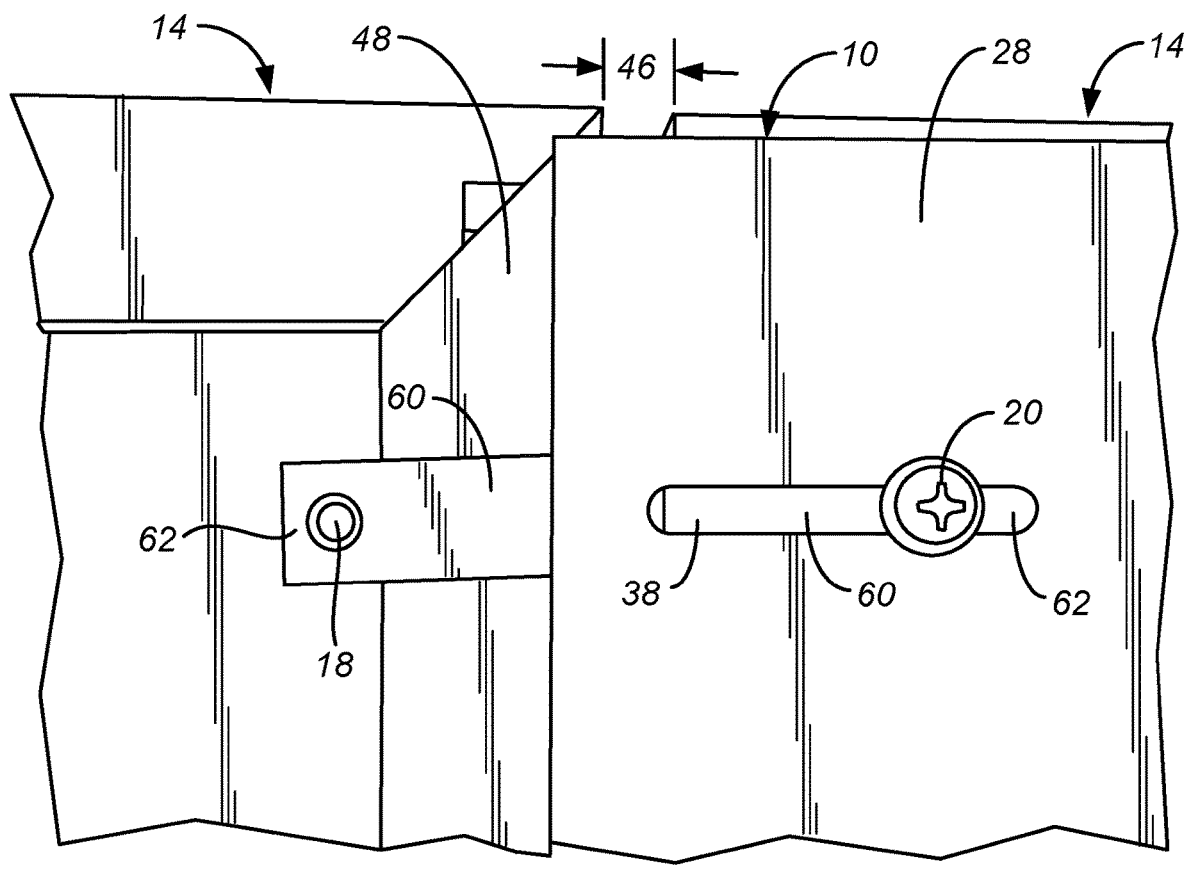
FIG. 4 is an enlarged view of a portion of the structure of FIG. 3 showing clips engaging trim pieces at opposed edges of adjacent PV panels.
Figure 5:
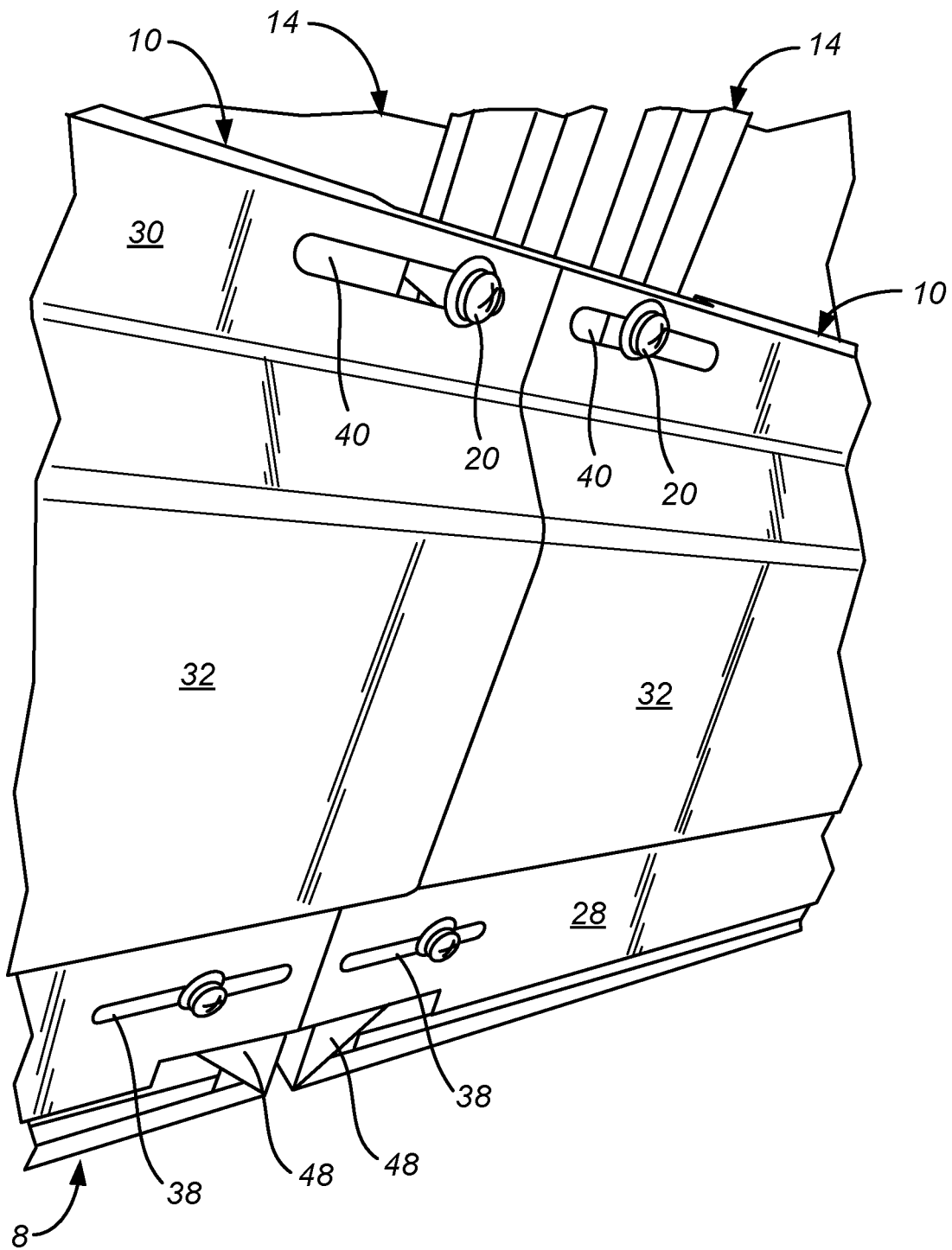
FIG. 5 is an enlarged perspective view a portion of the structure of FIG. 2 showing an end of one wire cover overlapping the end of an adjacent wire cover.
Figure 12:
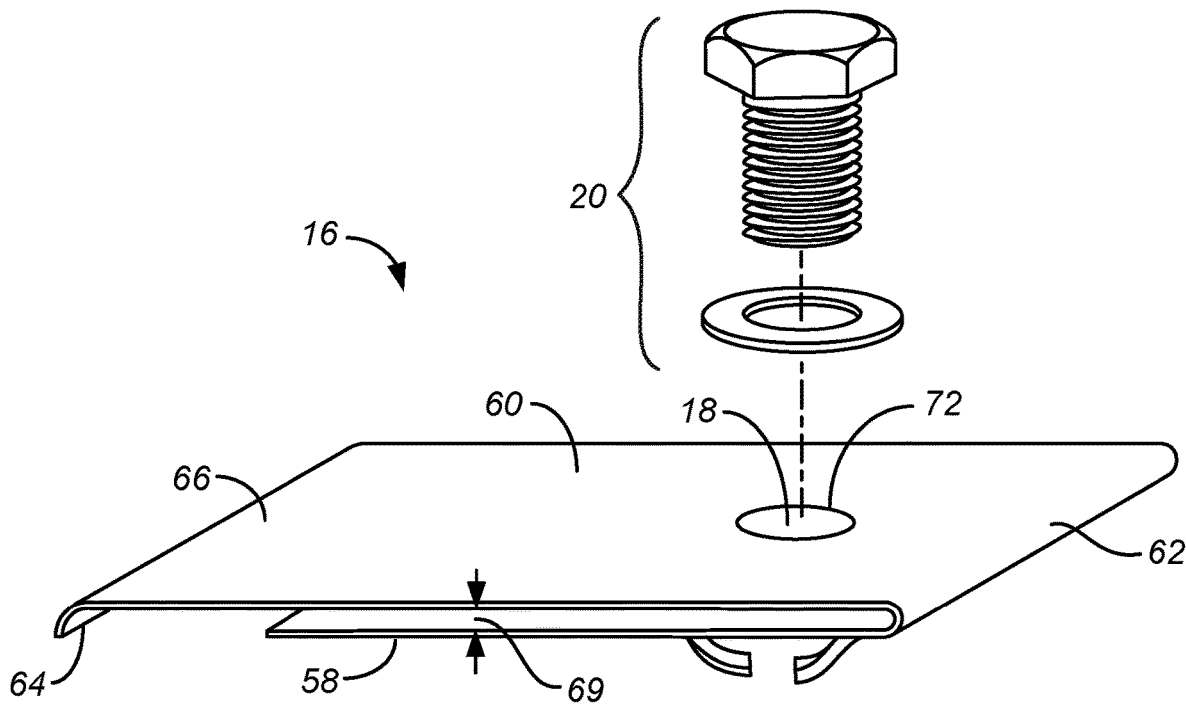
FIG. 12 is a top, front, right side view of a clip partially shown in FIG. 4 together with a fastener.
Figure 13:
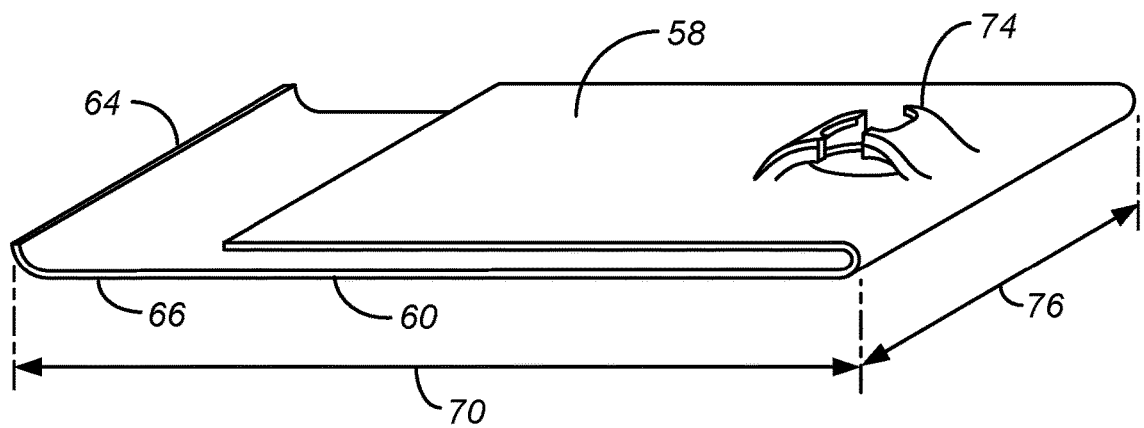
FIG. 13 is a bottom, front, right side view of the clip of FIG. 12.

Details of the clips 16 are shown in FIGS. 12 and 13, as well as FIG. 4 Each clip 16 can be a bent piece of spring steel (or optionally other material) which fits over a piece of trim 48 along the lateral sides 50 of the PV panels 14; see FIGS. 2-5. Trim 48 extends generally perpendicular to the side-to-side orientation of wires 12 and wire covers 10. Trim 48 is offset a distance slightly from a rear surface 54 of the panel with a width a distance sufficient to allow a short leg 58 of the clip 16 to reside therein. The clip 16 has a long leg 60 opposite the short leg 58 with the two legs substantially parallel to each other and joined together at a proximal end 62 of the clip. The long leg 60 ends at a trim engagement element 64, also called a tooth 64, at a distal end 66 thereof which can wrap around and grip somewhat an outer edge 68 of the trim 48. The proximal ends of each leg of the clip 16 are joined together so that the clip 16 is, in this example, a continuous piece of metal. A spacing or gap 69 between the legs 58, 60 of the clip 16 is preferably similar to a thickness of the trim 48 on the panel 14, so that somewhat of a friction fit is provided when the clip 16 is slid over the trim 48 with the trim 48 between the legs 58, 60.

Figure 20:
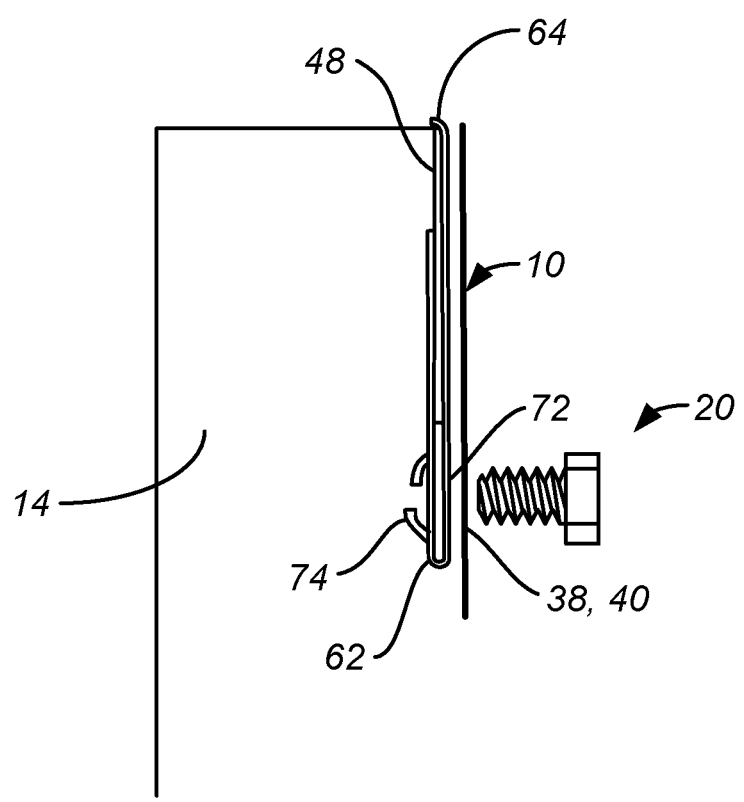
FIG. 20 is a simplified edge view showing a clip mounted to a trim piece of the solar panel with a flange of the wire cover about to be secured to the clip by a fastener.

FIG. 20 is a simplified edge view showing a clip 16 mounted to a trim piece 48 of the solar panel 14 with a flange 28, 30 of the wire cover 10 about to be secured to the clip by a fastener 20. An overall width of the clip 16 between the distal tooth 64 at the tip of the long leg 60 and a curve at the proximal end 62 where the long leg 60 and short leg 58 are joined together, see dimension 70 in FIG. 13, is greater than the width 56 of the trim 48 by an amount sufficient so that hole 18, which in this example includes a top through-hole 72 and a bottom threaded hole 74, passing through the clip 16 can be positioned off of the trim 48. See FIGS. 13 and 20. These holes 72, 74 pass through both the long leg 60 and the short leg 58 of the clip 16 with the holes adjacent to the curving proximal end 62 of the clip 16 which joins the long leg 60 and the short leg 58 together. The holes preferably are similar in size and aligned together, but, in this example, with the hole 74 in the short leg 58 being threaded and the hole 72 in the long leg 60 being a through hole and not threaded. It is also conceivable that both of the holes could be threaded or neither of the holes could be threaded and still function according to this technology if, for example, using non-threaded fasteners or if a threaded fastener pair such as a bolt and nut are used together. Most preferably, however, the short leg 58 has its hole 74 threaded and the long leg 60 does not have its hole 72 threaded.

In one embodiment, if the trim 48 has a one inch width 56, the long leg 60 could have a two inch length and the short leg 58 could have a one and a half inch length. In such a configuration a quarter inch hole could be provided which is spaced approximately a quarter inch to a half inch away from the curving proximal end 62 of the clip 16 where the long leg 60 and short leg 58 come together. The clip 16 could have various different widths 76; clip 16 is shown with approximately a three-quarter inch width in the embodiment depicted.

If the clip 16 is formed of materials other than spring steel (e.g., aluminum or plastic) it still preferably functions to clamp and hold to the trim 48. The clip 16 will then have a tendency to stay where initially placed. Furthermore, once a fastener 20 passes through the non-threaded hole 72 in the long leg 60 and then threads into the threads in the threaded hole 74 in the short leg 58, the long leg 60 and short leg 58 are drawn together and further pinch the clip 16 tightly against the trim 48. The clip 16 thus conveniently tends to stay where positioned before use, but can be repositioned fairly easily before it has been used, such as by sliding along the trim 48 with the tooth 64 at the distal end 66 of the long leg 60 keeping the clip 16 aligned where it is desired to be.

Once the clips 16 are positioned where desired, a wire cover 10 would be placed over wires 12 joining panels 14 together and with the elongate hole or slots 38, 40 in one of the flanges 28, 30 overlying the clip 16 and aligned with the holes in the clip 16. A fastener 20, such as a bolt, would then be passed through the elongate hole 38, 40 in the flange 28, 30 and then passed through the non-threaded hole 72 in the outer, long leg 60 of the clip 16, and then threaded into the threaded hole 74 in the short leg 58 of the clip 16. See FIG. 20. Once the fastener 20 has been tightened, not only has the clip 16 been secured in position against the trim 48 of the panel, but also the wire cover 10 has been secured to the panel as well. This process is repeated with additional clips 16 at corresponding locations on other portions of the wire covers 10 to securely cause the wire covers 10 to be mounted to overlie wires 12 joining the panels 14 together.

Figure 6:
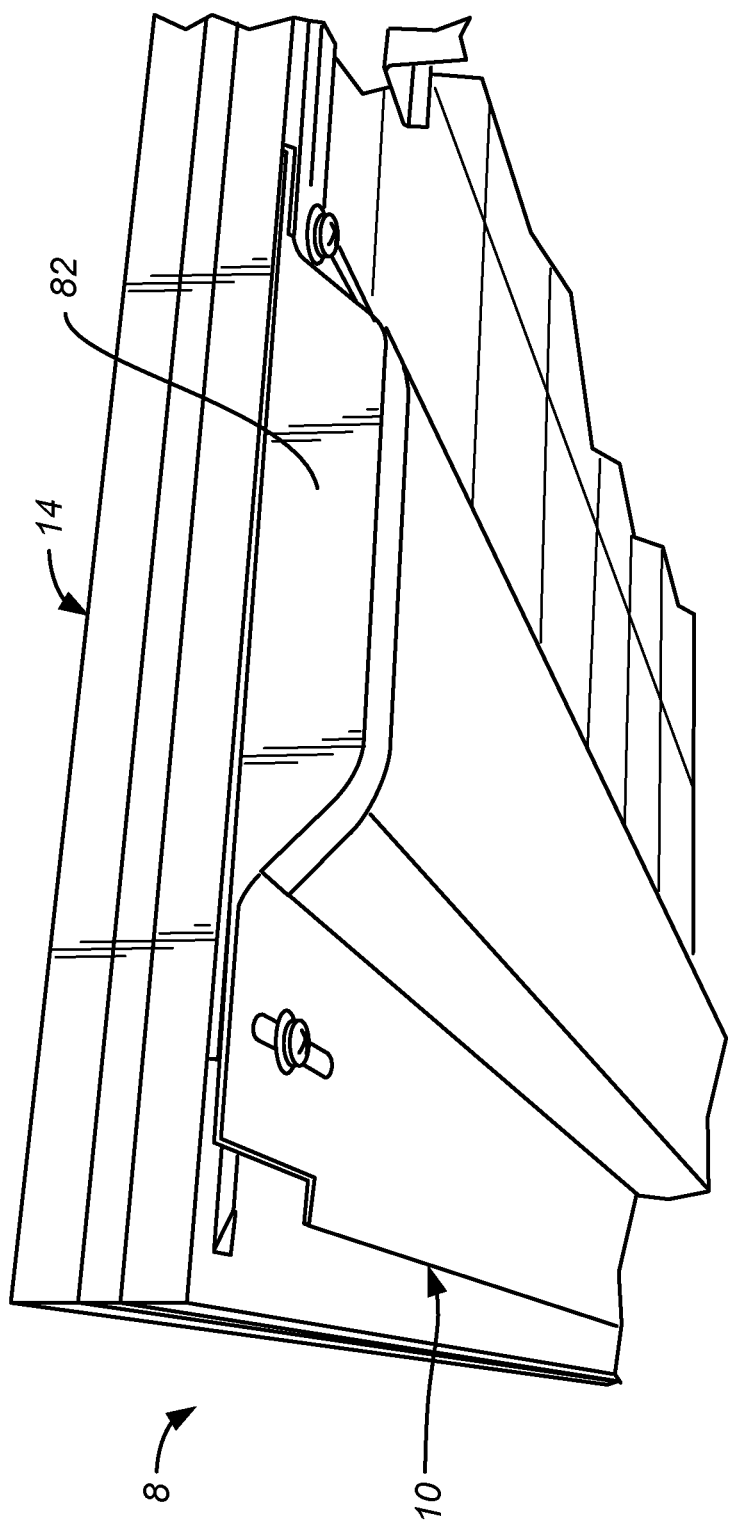
FIG. 6 shows an end cap covering the outermost end of the wire cover at the end of the array of photovoltaic panels.
Figure 7:
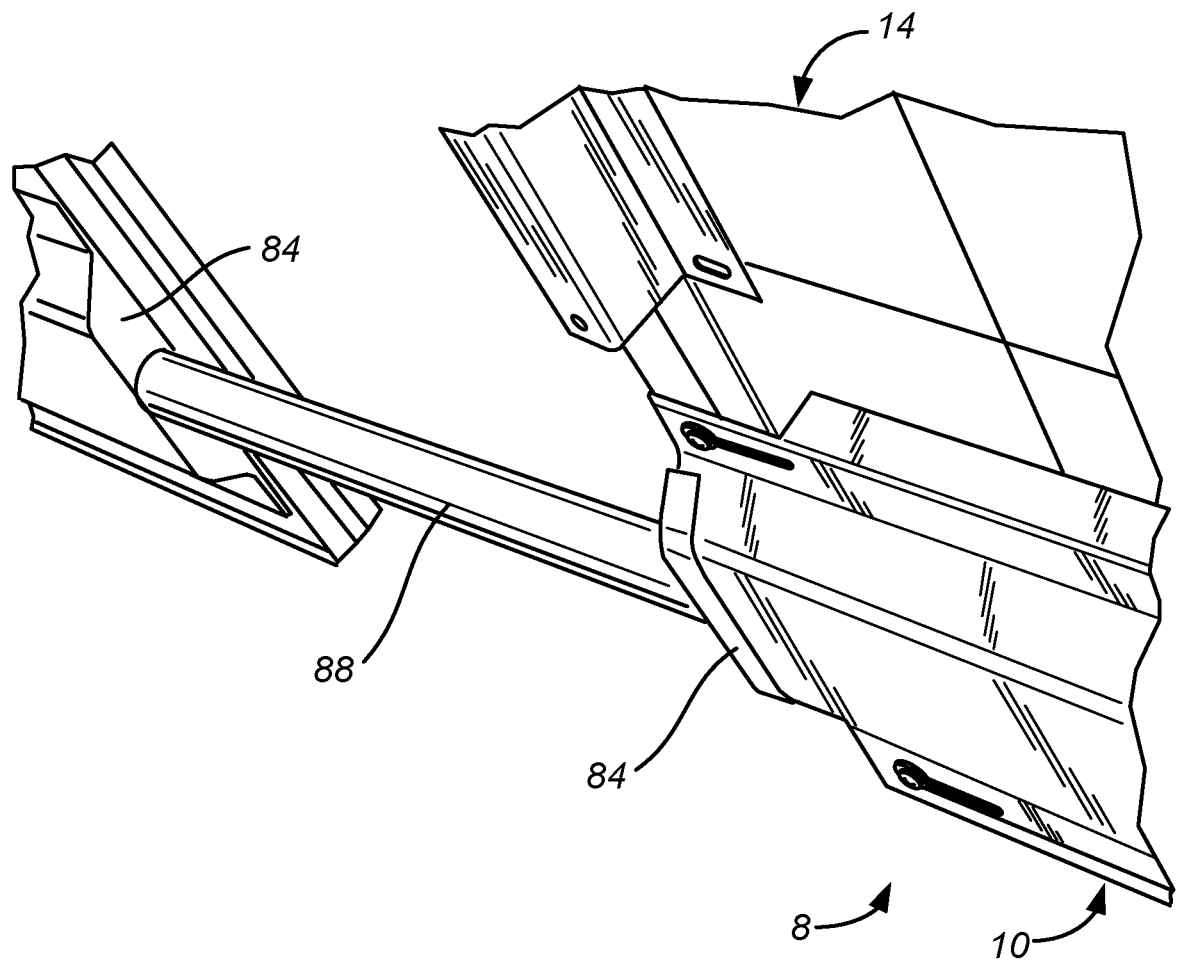
FIG. 7 shows a jumper tube extending between open end caps to protect wires passing between space-apart PV panels.
Figure 8:
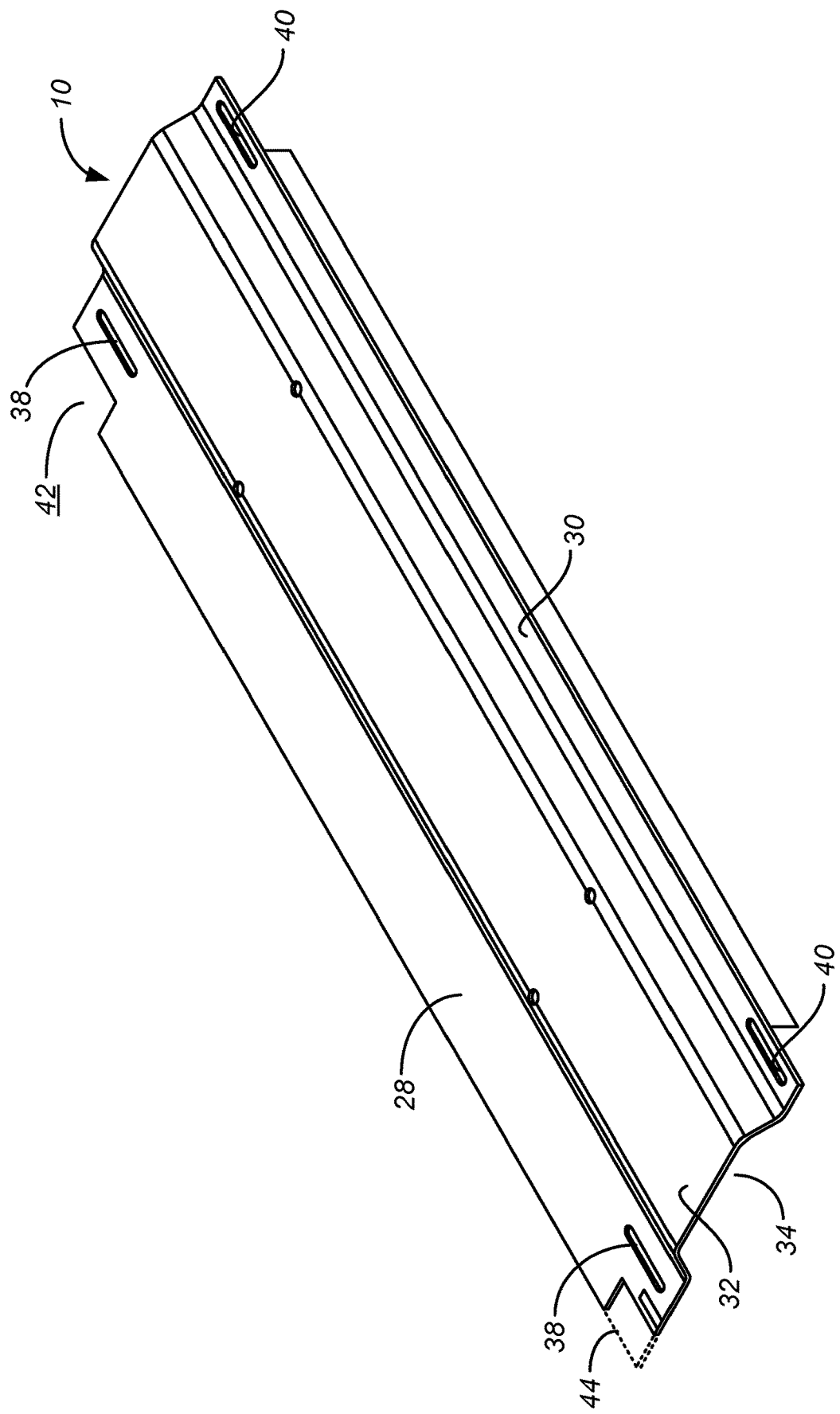
FIG. 8 is a top, front, right side isometric view of a wire cover.
Figure 9:
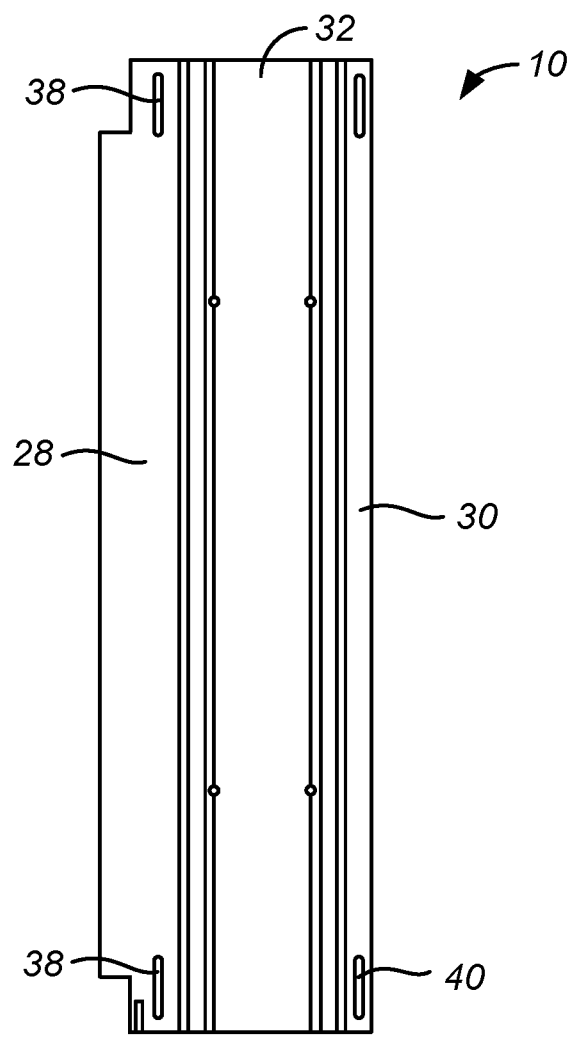
FIG. 9 is a top plan view of the wire cover of FIG. 8.
Figure 10:
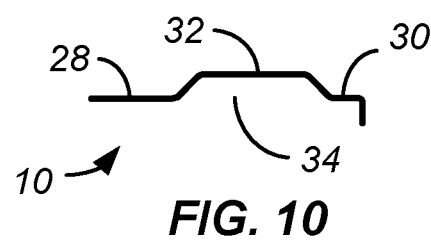
FIG. 10 is an end view of the wire cover of FIG. 8.
Figure 11:
FIG. 11 is a left side view of the wire cover of FIG. 8.
Figure 14:
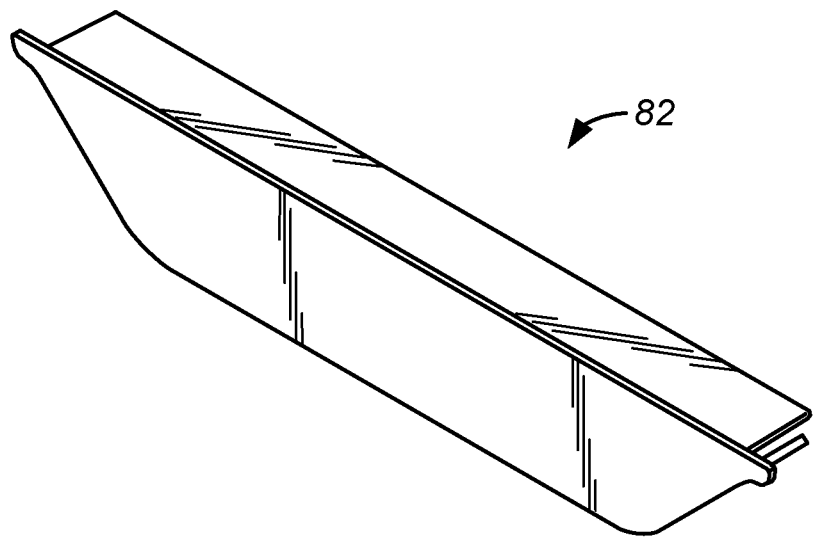
FIG. 14 is a front, top, right side view of the closed end cap shown in FIG. 6.
Figure 15:
FIG. 15 is a top plan view of the end cap of FIG. 14.
Figure 16:
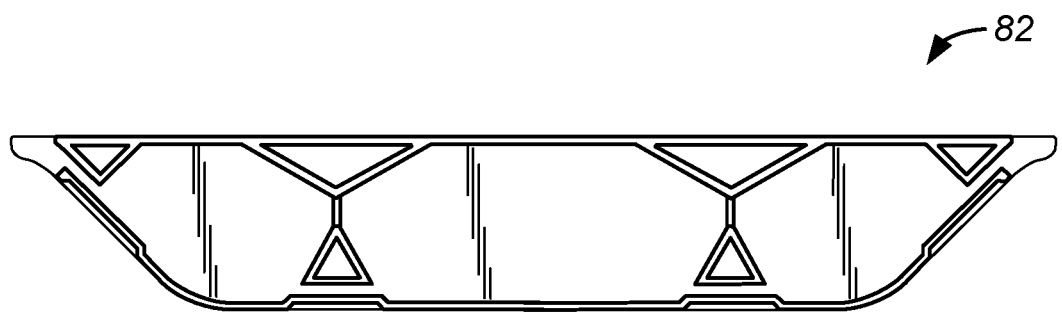
FIG. 16 is a rear elevation view of the end cap of FIG. 14.
Figure 17:
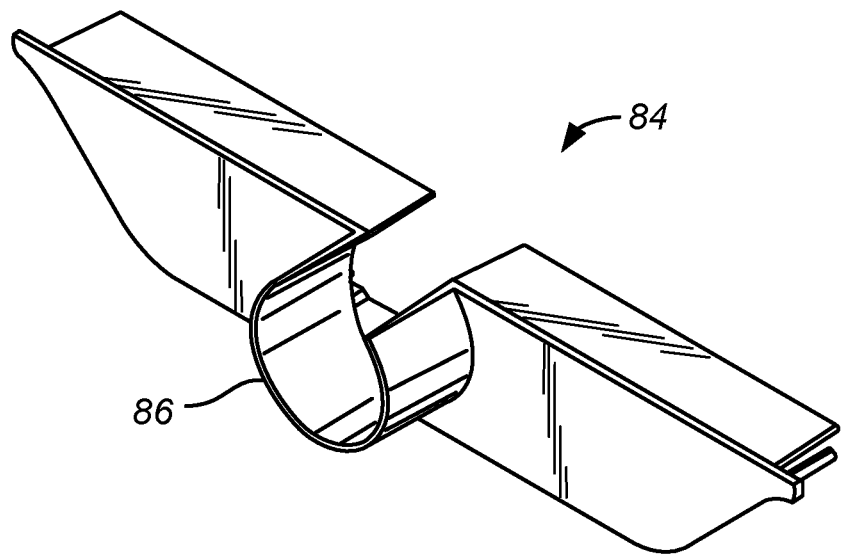
FIG. 17 is a front, top, right side view of the open end cap shown in FIG. 7.
Figure 18:
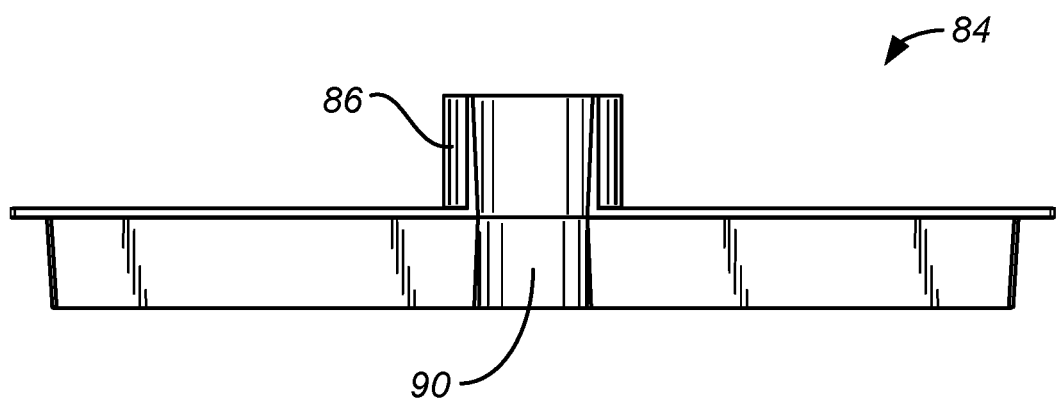
FIG. 18 is a top plan view of the end cap of FIG. 17.
Figure 19:
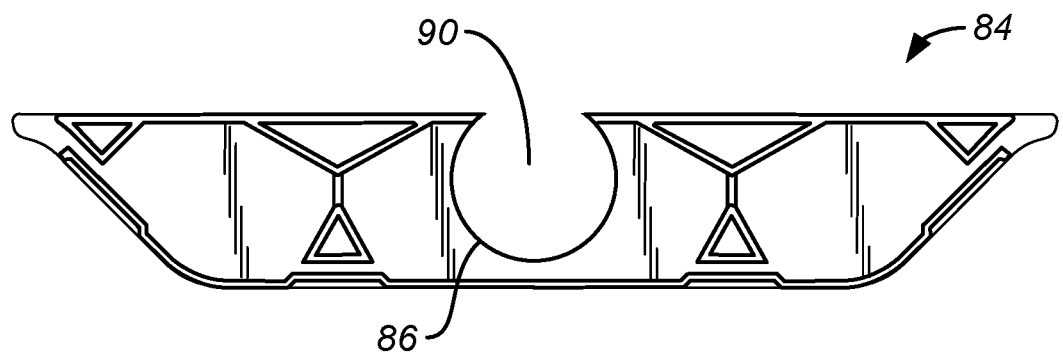
FIG. 19 is a rear elevation view of the end cap of FIG. 17.

FIG. 6 shows a closed end cap 82 covering the outermost end of the wire cover 10 at the end of the array 22 of photovoltaic panels 14. Details of end cap 82 are shown in FIGS. 14-16. FIGS. 7 and 17-19 illustrate an open end cap 84 secured to the outermost end of a wire cover 10. Open end caps 84 are used when there is a gap between PV panels 14, such as when there is a motor or other obstruction in the way on tracked arrays of PV panels. Open end cap 84 defines a wire passage opening 90 and has a curved extension 86 over which a jumper tube 88, see FIG. 7, is mounted. Wires 12 pass between the spaced-apart PV panels 14 along a wire passageway through wire passage opening 90, through curved extension 86 and through jumper tube 88. Use of closed end caps 82 and open end caps 84, together with jumper tube 88, helped to protect wires 12 from the elements, degradation or destruction by animals, and also helps to keep animals from entering housing interior 34. Jumper tube 88 can be made with somewhat flexible material, such as PVC or ABS, with a slit along its length to permit it to be placed over curved extensions 86 and the wires 12 extending between space-apart open end caps 84 as shown in FIG. 7. The length of jumper tube 88 is made to be slightly shorter than the distance between open end caps 84 so that it maintains contact with the curved extensions 86 of the open end caps.

If desired for further theft prevention, fasteners 20 having unique torque receiving surfaces can be used so that it is less likely that a thief has access to a proper tool for removal of such fasteners. The fasteners could be provided of a type which can allow for ready installation but does not allow for ready disassembly. For instance, rivets could be used instead of threaded fasteners or threaded fasteners with heads which allow for torque to be applied for fastening but not to be applied for removal. As a still further option, the fasteners could have heads which snap off after the fastener has been used, so that the torque applying head is removed and unavailable for theft access after installation.

Typically, wire covers 10 are provided which are of standard lengths which allow for convenient handling thereof, such as six foot lengths or ten foot lengths. The wire covers 10 can overlap each other somewhat at ends thereof to allow for continuous covering of the wires 12. Each wire cover 10 would typically have a length which spans two or more panels 14. The positions of the slotted holes 38, 40 are preferably selected to generally match widths 78 of the panels 14 but with the slotted holes sufficiently long to accommodate variations in panel size as well as spacing 46 between adjacent panels 14.

Covers 10 can be made of bent metal, such as galvanized sheet steel or of sheet aluminum. Covers 10 can also be made of polymer materials, such as PVC, typically through extrusion or molding techniques. While clips 16 are preferably made of materials such as spring steel to aid proper positioning; in some examples clips 16 may be made materials, such as layered materials, which may or may not exhibit the degree of resilience provided by spring steel. The covers 10 and clips 16 could alternatively be made of non-metal materials or metals of other varieties to optimize desired performance characteristics or to minimize expense or otherwise provide for benefits associated with particular materials selected.

This disclosure is provided to reveal a preferred embodiment of the technology and a best mode for practicing the technology. Having thus described the technology in this way, it should be apparent that various different modifications can be made to the preferred embodiment without departing from the scope and spirit of this disclosure. When structures are identified as a means to perform a function, the identification is intended to include all structures which can perform the function specified. One or more elements of one or more claims can be combined with elements of other claims. Any and all patents, patent applications and printed publications referred to above are incorporated by reference.

What is claimed is:

1. An assembly comprising:
   a clip comprised of a single continuous piece of material including a proximal end, a long leg and a short leg, the long leg joined to the short leg at a curved region at the proximal end of the clip, the long leg and the short leg each having a distal end, wherein the short leg is parallel to the long leg from the distal end of the short leg to the curved region,
   wherein the clip is mountable to a trim piece with the trim piece between the short leg and the long leg, and the long leg adjacent to the trim piece; and
   a fastener structure engageable with the short leg and the long leg to bias the short leg and the long leg towards a first flange of a cover including a plurality of slotted holes therein,
   whereby the cover can be fastened to the trim piece through the clip and one of the plurality of slotted holes in the first flange without penetrating the trim piece.

2. The assembly according to claim 1, further comprising:
   holes adjacent to the proximal end of the clip aligned with each other and passing through the short leg and the long leg; and
   the fastener structure comprising a fastener passing through the one of the plurality of slotted holes in the cover and into the holes in the clip.

3. The assembly according to claim 2, wherein the clip comprises a trim engagement element at the distal end of the long leg.

4. The assembly according to claim 3, wherein the distal end of the long leg is a curved distal end constituting the trim engagement element.

5. The assembly according to claim 2, wherein the hole in the long leg is a through hole through which a fastener can freely pass and the hole in the short leg is configured to engage the fastener.

6. The assembly according to claim 5, wherein the fastener is a threaded fastener and the hole in the short leg is a threaded hole for threaded engagement with the threaded fastener.

7. The assembly according to claim 6, wherein the long and short legs can be drawn towards one another by the engagement of the threaded hole in the short leg by the fastener.

8. The assembly according to claim 1, wherein the cover has an open end, and further comprising:
   a closed end cap mountable to the open end of the cover to prevent access to an interior of the cover.

9. The assembly according to claim 1,
   wherein the clip is mounted to a trim piece with the trim piece between and contacting an inner surface of the short leg and an inner surface of the long leg, and
   wherein the cover is fastened to the trim piece via contact with an outer surface of the long leg and through the clip without penetrating the trim piece.

10. An assembly for use with a panel having a perimeter trim piece, the perimeter trim piece having a thickness, the assembly comprising:
    a plurality of clips, each clip, of the plurality of clips, being comprised of a single continuous piece of material including a proximal end, a long leg and a short leg, for each clip the long leg is parallel with and joined to the short leg at the proximal end, the long leg of each clip having a distal end;
    a gap between the long leg and the short leg of each clip sized for receipt of a perimeter trim piece of a panel;
    a first flange of a cover positioned against the long leg of at least one of the clips, the first flange of the cover including a plurality of slotted holes therein; and
    a fastener structure engaging the short leg of the at least one of the clips and one of the plurality of slotted holes in the first flange and the first flange to bias the first flange and the long leg of the at least one of the clips therewith towards the short leg of the at least one of the clips,
    whereby the cover can be fastened to the perimeter trim piece of the panel through the clips without penetrating the panel.

* * * * *